April 5, 1966 D. D. WALKER ETAL 3,244,429
UNIVERSAL GEAR CHUCK
Filed May 4, 1964 2 Sheets-Sheet 1
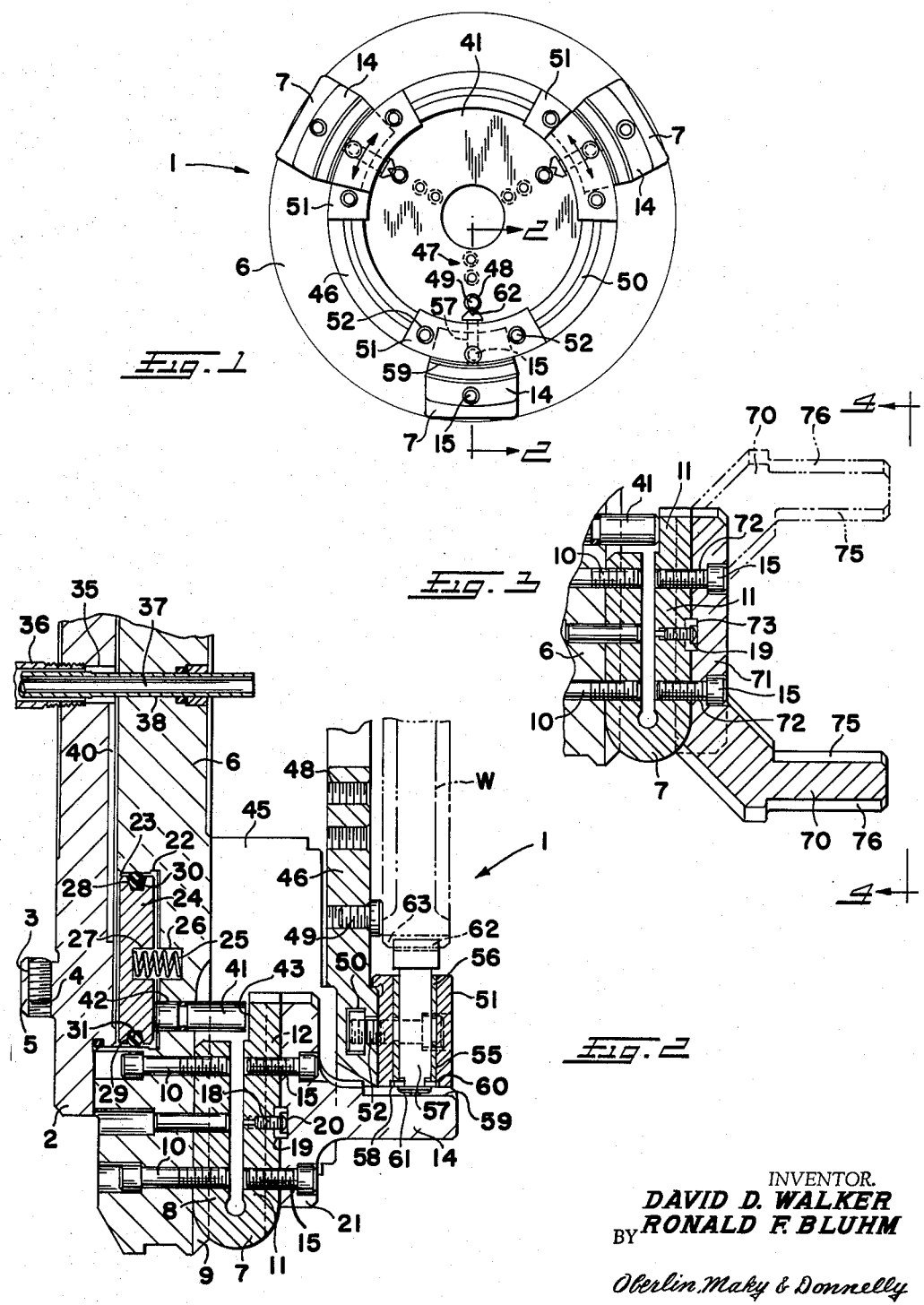
INVENTOR.
DAVID D. WALKER
BY RONALD F. BLUHM
Oberlin, Maky & Donnelly
ATTORNEYS April 5, 1966     D. D. WALKER ETAL     3,244,429
UNIVERSAL GEAR CHUCK
Filed May 4, 1964     2 Sheets-Sheet 2
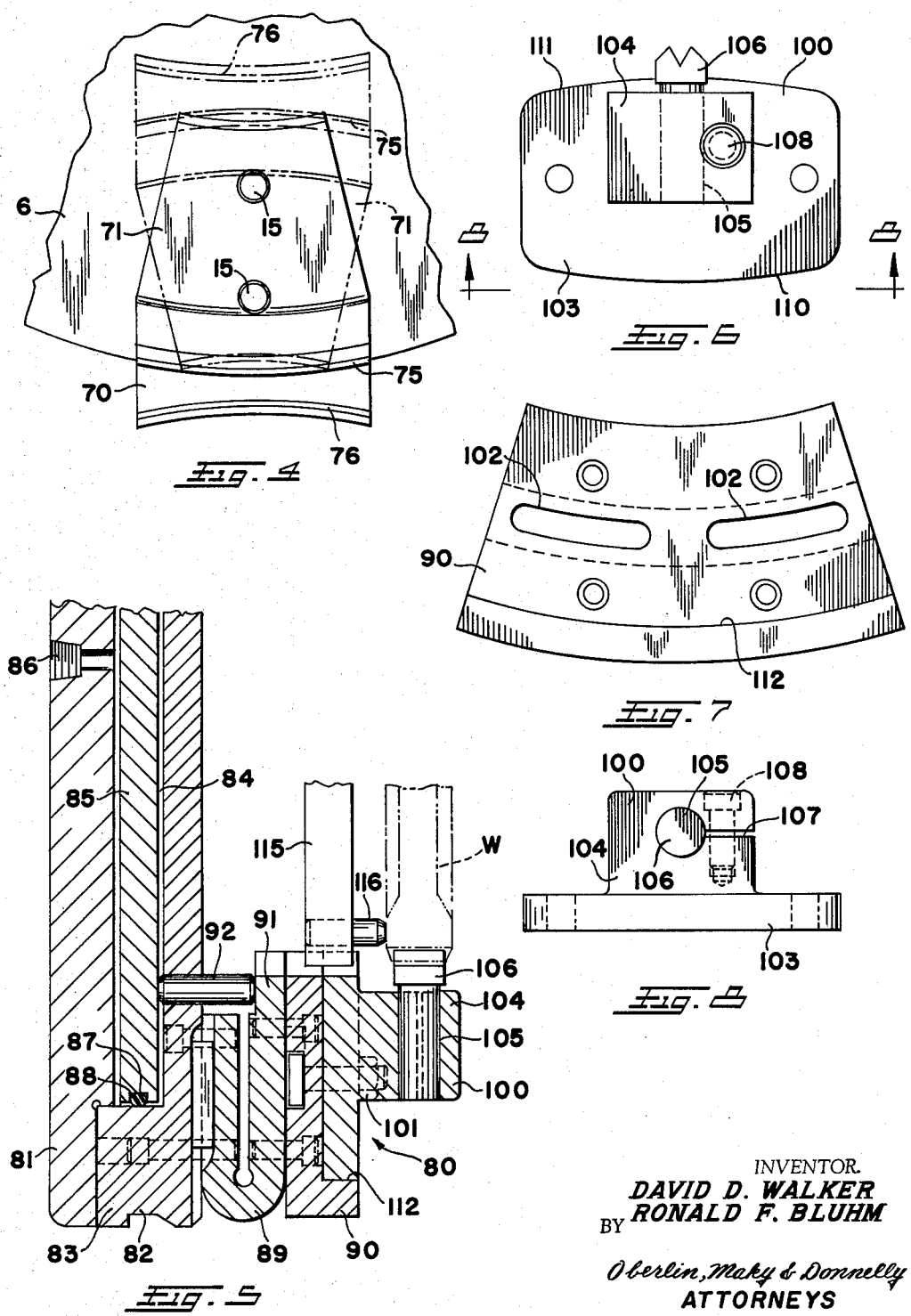
INVENTOR.
DAVID D. WALKER
RONALD F. BLUHM
BY
Oberlin, Maky & Donnelly
ATTORNEYS United States Patent Office 3,244,429
Patented Apr. 5, 1966

3,244,429
UNIVERSAL GEAR CHUCK
David D. Walker, Chagrin Falls, and Ronald F. Bluhm, Euclid, Ohio, assignors to Erickson Tool Company, Solon, Ohio, a corporation of Ohio
Filed May 4, 1964, Ser. No. 364,431
7 Claims. (Cl. 279—110)

This invention relates generally, as indicated, to a universal gear chuck and, more particularly, to a gear chuck having a universal cage for holding gears of varying pitch and pitch diameters.

Heretofore, when it was desired to use the same chuck to hold gears of different pitch for performing various finishing operations thereon, it was generally necessary to replace one cage of the chuck with another, since the pitch line locating pins carried by any one cage could only hold gears having approximately the same pitch. For example, if the cage had three locating pins equally spaced around the circumference thereof, 12-tooth, 15-tooth, or 18-tooth gears could be chucked thereby with suitable locating pins. However, if the part to be chucked had some other number of teeth, such a 3-pin cage could not accurately hold such part since the locating pins would engage the teeth at the wrong annular position.

Accordingly, it is a principal object of this invention to provide a gear chuck with a universal cage for accurately and securely holding gears the teeth of which may vary in number and pitch.

It is another object to provide such a universal cage with adjustable blocks for carrying pitch line locating pins, such blocks being adjustable to suit the number of teeth in the gears held thereby.

Still another object is to provide a universal chuck the master jaws and cage of which may be replaced by master jaws and cages of different sizes to accommodate parts within a relatively wide range of sizes.

Yet another object is to provide a universal chuck the master jaws of which are reversible to accommodate different sized parts.

Another object is to provide a universal gear chuck with locating pin blocks or holders which are reversible to accommodate different sized parts.

Still another object is to provide such reversible pin holders with means for releasably securing pitch line locating pins in a multitude of different radial positions depending on the size of the parts to be clamped thereby.

Another object is adjustably to secure such pin holders directly to the master jaws of such a universal gear chuck.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative however, of but a few of the various ways in which the principle of the invention may be employed.

In said annexed drawings:

FIG. 1 is a front elevation of a preferred form of universal gear chuck constructed in accordance with the present invention;

FIG. 2 is an enlarged fragmentary sectional view of such universal gear chuck taken on the plane of the line 2—2 of FIG. 1;

FIG. 3 is an enlarged fragmentary sectional view showing a large capacity jaw mounted on such chuck;

FIG. 4 is a fragmentary end view of the large capacity jaw of FIG. 3 as viewed from the right end thereof;

FIG. 5 is an enlarged fragmentary sectional view of a modified form of such universal gear chuck;

FIG. 6 is an end view of the reversible pin holder of FIG. 5 as viewed from the right end thereof;

FIG. 7 is an end view of the master jaw of FIG. 5 as viewed from the right end thereof with the reversible pin holder removed; and FIG. 8 is a bottom view of the reversible pin holder of FIG. 6.

Referring now to the drawings, and first of all to FIGS. 1 and 2, there is shown a preferred form of universal gear chuck 1 which includes a mounting plate 2 adapted to be secured to a spindle of a machine tool or the like as by means of a set screw 3 threadedly engaging a tapped hole 4 radially extending through an annular flange 5 on the rear face of the mounting plate 2. Mounted on the front face of the mounting plate 2 there is a master jaw carrier plate 6 which has a plurality of circumferentially spaced, generally U-shaped spring members 7 secured thereto. While the number of spring members used may be varied as desired, it is desirable that there be three of such spring members equally spaced around the periphery of the carrier plate 6. Such spring members are preferably of the type disclosed in Patent No. 3,006,654, granted to Milton L. Benjamin on October 31, 1961.

The inner leg 8 of each spring member 7 is secured in a radial groove 9 in the front face of the plate 6 by means of suitable fasteners 10, while the outer leg 11 of each such spring member 7 has a radial groove 12 in which a master jaw 14 is mounted by suitable fasteners 15.

Secured to the outer leg 11 of the spring member 7 as by means of a cap screw 18 is a key 19 which is adapted to be received in a recess 20 provided in the base 21 of each master jaw 14 for locating the master jaw on such spring member.

The jaw carrier plate 6 has an annular recess 22 which forms with the mounting plate 2 a ring-shape cylinder 23 in which there is disposed a similarly shaped piston 24 for reciprocating movement therein. The piston 24 is yieldably urged to the left as viewed in FIG. 2 by a plurality of circumferentially spaced compression springs 25 each of which has one end seated in a recess 26 in the carrier plate 6 and the other end seated in a recess 27 in the piston 24. Such ring-shape piston 24 is provided with annular grooves 28 and 29 in the inside and outside diameter surfaces thereof in which there are disposed O-rings 30 and 31, respectively. These O-rings 30 and 31 are adapted to form a fluid-tight seal between the adjacent walls of the cylinder 23 and piston 24.

Centrally disposed on the mounting plate 2 is an axially extending air pressure inlet port 35 to which an air supply pipe 36 is threadedly connected. Concentrically disposed within the air supply pipe 36 there may be provided a coolant supply pipe 37 which extends through a centrally disposed opening 38 in the jaw carrier plate 6. The coolant supply pipe 37 is adapted to direct a coolant against a workpiece W mounted in the chuck 1, thus preventing overheating of such workpiece while finishing operations are being performed thereon.

Between the opposed faces of the mounting plate 2 and carrier plate 6 there is provided an annular space 40 for establishing fluid communication between the inlet port 35 and the cylinder 23. Thus, as is readily apparent, when air under pressure is admitted to the inlet port 35 via the air supply pipe 36, such air passes through the space 40 into the left end of cylinder 23 as viewed in FIG. 2 and urges the piston 24 to the right against the bias of the springs 25. During such movement, the front face of piston 24 engages pins 41 extending through apertures 42 in the carrier plate 6 and forces the same to the right against the inner face 43 of the outer leg 11 of the respective spring members 7 to swing the master jaws 14 outwardly to release the workpiece W, as will be more fully explained hereafter.

Secured to the front face of the carrier plate 6 are a plurality of circumferentially spaced mounting blocks 45 against the outer face of which a universal cage 46 in the shape of an annular ring is releasably mounted by means of suitable fasteners (not shown).

A plurality of circumferentially spaced sets 47 of tapped holes extend axially through the cage 46, each set including a plurality of radially aligned holes 48. Extending axially outwardly from such holes 48 there may be provided stop screws 49 against which one side of the workpiece W may be positioned.

In the front face of the cage 46 there is provided an annular T-shape slot 50 to which there is mounted for limited movement therealong a locating pin block 51 adjacent and in radial alignment with each master jaw 14 by means of nut and bolt assemblies 52.

A radial opening 55 having a bushing 56 disposed therein is provided in each block 51 for the reception of a pitch line locating pin 57. A spring washer 58 is provided for urging the pin 57 radially outwardly against the inner arcuate surface 59 of the jaw 14, such spring 58 being disposed in a recess 60 in the block 51 and engaging a snap ring 61 on the outer end of the pin 57.

When it is desired to insert a workpiece W between the jaws 14 of the chuck 1, the jaws are urged outwardly by creating air pressure behind the piston 24 to drive the piston and pins 41 to the right as viewed in FIG. 2 against the inner surface of the outer leg 11 of the U-shaped spring members 7. When so urged, the locating pins 57 are also urged outwardly by the spring washers 58, thus establishing a relatively large gap between the locating pins 57 into which the workpiece W may be inserted and positioned against the stop screws 49. Next, the air pressure behind the piston 24 is released and the jaws 14 are swung inwardly by the spring members 7, thereby pressing the pins 57 radially inwardly against the bias of spring washers 58 until their inner tooth engaging grooves 62 engage the teeth 63 of the work W to hold the same with its axis coinciding with the axis of rotation of the chuck 1.

Should the spacing and number of teeth of the workpiece W be such that the locating pins 57 do not properly line up with such teeth, the pins may be adjusted by moving the blocks 51 along the slot 50 in either a clockwise or counterclockwise direction as viewed in FIG. 2 until proper alignment is established as by aligning suitable reference marks on the locating pin blocks 51 with certain graduations and/or gauge buttons (not shown) properly located on the universal cage 46.

Should the size of the teeth 63 of the workpiece W be such that the tooth engaging grooves 62 of the locating pins 57 will not properly engage the teeth, such pins can readily be replaced with pins having tooth engaging grooves that will engage the teeth in the desired manner.

While the chuck 1 is shown in FIG. 2 as having three jaws 14 and three blocks 51, each of which is provided with a locating pin 57, it should readily be appreciated that the number of such jaws and blocks having locating pins therein may be varied as desired. For example, there may be 3, 4, 6, or 8 jaws and 3, 4, 6, or 8 corresponding blocks to accept 3, 4, 6, or 8 locating pins, respectively.

In order to hold workpieces W of different diameters, a plurality of interchangeable cages 46 and master jaws 14 having different capacities may be provided. In FIG. 3, for example, a large capacity jaw 70 is shown as having a radially and axially outwardly projecting arm 71 mounted on the front face of the outer leg 11 of the spring member 7. A cage (not shown) having a diameter sufficiently large to fit properly within the confines of the jaws 70 is mounted on the mounting blocks, also not shown.

Preferably, the location of the apertures 72 in the jaw 70 through which the fasteners 15 are adapted to extend for securing such jaw to the spring member 7 are equally spaced from the recess 73 provided in the arm 71 for receiving the key 19 so that the jaw may be reversed or turned 180° to the phantom line position of FIGS. 3 and 4 when it is desired to use the chuck 1 for holding small diameter gears and the like. Of course it should be understood that if the jaw 70 is to be reversible, both the inner surface 75 and outer surface 76 of the jaw 70 must be concave, the radius of curvature of the inner surface 75 being equal to its distance from the axis of rotation of the chuck 1 when the jaw 70 is disposed in the solid line position, and the radius of curvature of the outer surface 76 being equal to its distance from the axis of rotation of the chuck 1 when the jaw is disposed in the phantom line position.

However, if desired two different jaws 70 may be provided, one having a single inner arcuate surface 75 to be used only in the solid line position of FIGS. 3 and 4 as a large capacity jaw, and the other having a single outer arcuate surface 76 to be used only in the phantom line position as a small capacity jaw.

The jaw 14 and cage 46 of FIGS. 1 and 2, on the other hand, are of intermediate capacity, the radial spacing of the inner arcuate surface 59 of such jaw 14 from the axis of rotation of the chuck 1 being less than the radial spacing of the inner arcuate surface 75 of the jaw 70 in the solid line position of FIGS. 3 and 4, but being more than the radial spacing of the outer arcuate surface 76 of the jaw 70 in the phantom line position.

While all of the locating pin blocks 51 are shown in FIGS. 1 and 2 as being movable along the slot 50, it should be understood that one of such blocks could be fixedly mounted on the cage 46 by means of a dowel pin (not shown) and still not preclude the chuck 1 from accepting workieces W having teeth 63 the spacing of which may vary over a wide range, since proper pin and tooth alignment could still be achieved through adjustment of the remaining movable blocks.

A further modification of the universal chuck of the present invention is illustrated in FIGS. 5–8, wherein there is shown a chuck 80 including a mounting plate 81 and a jaw carrier plate 82 having an axially inwardly extending flange 83 which forms with the mounting plate 81 an annular chamber or cylinder 84. Within such cylinder 84 there is disposed a piston 85 which is adapted to be urged to the right as viewed in FIG. 5 when air under pressure is supplied through a centrally disposed inlet port 86 in the mounting plate 81. An O-ring 87 is provided in an annular groove 88 in the radial outer edge of the piston 85 for establishing a fluid tight seal between such piston and the walls of the cylinder 84.

A plurality (preferably three) of circumferentially spaced U-shape spring members 89 similar to the spring members 7 of FIGS. 1–4 are secured to the jaw carrier plate 82. Each of the spring members 89 is adapted to support a master jaw 90 for radial outward and inward movement due to the application and relaxation of pressure on the radially inner end of the outer leg 91 of each spring member 89 through the piston 85 and pin 92.

Thus, it should readily be apparent that the operation of the modified chuck 80 is quite similar to the operation of the chuck 1. However, the locating pin blocks or holders 100, rather than being mounted in a T-shape slot in a universal cage for limited movement therealong in the manner shown in FIGS. 1 and 2, are mounted directly on their respective master jaws 90 by means of a pair of nut and bolt assemblies 101 extending into a pair of circumferentially spaced annular T-shape slots 102 for limited arcuate movement.

Each of the pin holders 100 is provided with a base portion 103 through which the nut and bolt assemblies 101 are adapted to extend and an axially outwardly projecting portion 104 which is provided with a radially extending aperture 105 for receiving a locating pin 106. A slot 107 is provided in the projecting portion 104 of the pin holder 100 which extends into the aperture 105 (see FIG. 8), and a clamping screw 108 extends through the walls of such slot 107, whereupon tightening of the screw 108 will draw the walls of the slot 107 together and clamp the locating pin 106 within the aperture 105. Thus, the pin 106 may be radially adjusted by loosening the clamping screw 108, moving the pin either inwardly or outwardly as desired depending on the size of the gear to be clamped by the chuck, and retightening the screw 108.

The axially outwardly projecting portion 104 of the pin holder 100 may be disposed radially inwardly of the longitudinal axis of the base portion 103 as shown in FIGS. 5 and 6 so that larger diameter gears may be accommodated by the chuck 80 simply by reversing or rotating the pin holder 100 180 degrees. In such reverse position, the spacing of the radial innermost surface of the projecting portion 104 of the pin holder 100 from the axis of rotation of the chuck 80 is increased by the distance that the projecting portion is offset from the longitudinal axis of the base portion 103.

Of course, both the radial outer and inner edges 110 and 111 of the base portion 103 should be provided with convex arcuate surfaces complemental with the concave inner arcuate surface 112 of the master jaw 90 so that limited arcuate movement of the pin holder 100 along the radial slots 102 in the jaw 90 can be effected in both the normal and reverse positions. Moreover, it should be readily apparent that when the pin holder 100 is reversed, the locating pins 106 must also be reversed.

Secured to the jaw carrier plate 82 radially inwardly of the master jaws 90 is a spider stop plate 115 axially outwardly from which projects a plurality of circumferentially spaced stop pins 116 against which one side of the workpiece W may be positioned.

In summary then, it can be seen that the above-disclosed forms of chucks are quite flexible and may be quickly and easily modified to hold parts having a wide range of diameters and spacing of pin engaging surfaces. Not only are the locating pin blocks slidable in an annular groove in the cage or jaws of the chuck to allow the pins to be brought into proper alignment with such pin engaging surfaces, but also the cage and jaws, as well as the locating pins and pin holders are interchangeable so that the chuck can accommodate workpieces having a wide range of diameters, thus making such chucks universal within their respective ranges.

Other modes of applying the principles of the invention may be employed, change being made as regards the details described, provided the features stated in any of the following claims or the equivalent of such be employed.

We therefore, particularly point out and distinctly claim as our invention:

1. A chuck comprising a jaw carrier plate, a plurality of jaws, means mounting said jaws in circumferentially spaced relation on said jaw carrier plate for radial movement, universal cage means secured to said jaw carrier plate between said jaws, a plurality of locating pin blocks carried by said cage means, one of said blocks being mounted adjacent to and in radial alignment with each of said jaws, a radially extending locating pin provided in each of said blocks, means mounting at least one of said locating pin blocks on said universal cage means for limited crcumferential movement adjacent its associated jaw including an arcuate slot in said universal cage means and a nut and bolt assembly means slidably mounting said locating pin block in said slot, and spring means associated with said locating pins for maintaining said locating pins in engagement with said jaws, whereby radial inward and outward movement of said jaws is transmitted to said locating pins to cause the same to grip and to release a workpiece disposed therebetween.

2. The chuck of claim 1 wherein said arcuate slot is T-shaped.

3. The chuck of claim 1 wherein said jaws have axially extending jaw portions which are engaged by said locating pins, said jaw portions being radially offset with respect to the jaw mountings, whereby said jaws may be reversed to accommodate different sized parts, the jaw portion of said jaw associated with said circumferentially movable locating pin block having both concave inner and outer surfaces, the radius of curvature of said inner surface being equal to its distance from the axis of rotation of said chuck when said jaw is disposed in the normal position, and the radius of curvature of said outer surface being equal to its distance from the axis of rotation of said chuck when said jaw is reversed.

4. The chuck of claim 1 wherein said means mounting said jaws on said jaw carrier plate for radial movement comprises a plurality of circumferentially spaced U-shape spring members having one leg secured to said jaw carrier plate and the other leg secured to said jaws, and means operative to engage said other leg yieldably to spread apart the legs of said spring members and thereby swing said jaws radially outward.

5. The chuck of claim 1 wherein means are provided for mounting all of said locating pin blocks and thus said locating pins on said universal cage means for limited circumferential movement.

6. A chuck for releasably holding a workpiece comprising a jaw carrier plate, means for securing said jaw carrier plate to a machine tool, a plurality of jaws mounted on said jaw carrier plate, means mounting said jaws on said jaw carrier plate for radial movement toward and away from the longitudinal axis of said chuck, a plurality of workpiece locating means mounted on said chuck between said jaws, one of said workpiece locating means being disposed adjacent each of said radially movable jaws for radial movement therewith, and means mounting at least one of said workpiece locating means on said chuck for limited arcuate movement, each of said workpiece locating means comprising a base portion, an axially outwardly projecting portion, said axially outwardly projecting portion being provided with a radially extending aperture for receiving a locating pin, and means for adjustably securing said locating pin in said aperture in a multitude of different radial positions depending upon the size of workpiece to be clamped thereby, said axially outwardly projecting portion of said workpiece locating means being offset with respect to the longitudinal axis of said base portion whereupon reversing of said workpiece locating means will allow said chuck to accommodate different sized parts.

7. The chuck of claim 6 wherein said means for adjustably securing said locating pin in said aperture comprises a slot in said axially outwardly projecting portion which extends into said aperture, and a clamping screw extending through the walls of said slot, whereupon tightening of said screw will draw the walls of said slot together and clamp said locating pin in said aperture.

References Cited by the Examiner

UNITED STATES PATENTS

| 2,543,117 | 2/1951 | Mackmann | 279—1.1 |
| 2,568,585 | 9/1951 | Hohwart | 279—46 |
| 2,965,384 | 12/1960 | Lowe | 279—123 |
| 3,006,653 | 10/1961 | Benjamin. | |
| 3,006,654 | 10/1961 | Benjamin | 279—23 |

LESTER M. SWINGLE, *Primary Examiner.*

ROBERT C. RIORDON, *Examiner.*

H. V. STAHLHUTH, *Assistant Examiner.*